US010328550B2

(12) United States Patent
Westraadt

(10) Patent No.: US 10,328,550 B2
(45) Date of Patent: Jun. 25, 2019

(54) SUPERHARD CONSTRUCTIONS AND METHODS OF MAKING SAME

(71) Applicant: Element Six Abrasives S.A., Luxembourg (LU)

(72) Inventor: Johan Ewald Westraadt, Springs (ZA)

(73) Assignee: ELEMENT SIX ABRASIVES S.A. (LU)

( * ) Notice: Subject to any disclaimer, the term of this patent is extended or adjusted under 35 U.S.C. 154(b) by 622 days.

(21) Appl. No.: 14/648,984

(22) PCT Filed: Dec. 2, 2013

(86) PCT No.: PCT/EP2013/075261
§ 371 (c)(1),
(2) Date: Jun. 2, 2015

(87) PCT Pub. No.: WO2014/086721
PCT Pub. Date: Jun. 12, 2014

(65) Prior Publication Data
US 2016/0016291 A1 Jan. 21, 2016

Related U.S. Application Data

(60) Provisional application No. 61/733,174, filed on Dec. 4, 2012.

(30) Foreign Application Priority Data

Dec. 4, 2012 (GB) .................................. 1221800.4

(51) Int. Cl.
| B24D 3/10 | (2006.01) |
|---|---|
| B24D 18/00 | (2006.01) |
| B24D 99/00 | (2010.01) |
| E21B 10/26 | (2006.01) |
| E21B 10/50 | (2006.01) |
| B22F 5/00 | (2006.01) |
| B22F 7/06 | (2006.01) |
| C04B 35/52 | (2006.01) |
| C22C 26/00 | (2006.01) |
| E21B 10/55 | (2006.01) |
| E21B 10/567 | (2006.01) |

(52) U.S. Cl.
CPC .................. *B24D 3/10* (2013.01); *B22F 7/06* (2013.01); *B24D 18/0009* (2013.01); *B24D 99/005* (2013.01); *C04B 35/52* (2013.01); *C22C 26/00* (2013.01); *E21B 10/26* (2013.01); *E21B 10/50* (2013.01); *E21B 10/55* (2013.01); *E21B 10/567* (2013.01); *B22F 2005/001* (2013.01); *C04B 2235/427* (2013.01)

(58) Field of Classification Search
CPC .......... E21B 10/46; E21B 10/26; E21B 10/50; E21B 10/55; E21B 10/567; B22F 2005/001; C04B 35/52; C22C 26/00
See application file for complete search history.

(56) References Cited

U.S. PATENT DOCUMENTS

| 5,453,105 | A | 9/1995 | Middlemiss et al. |
|---|---|---|---|
| 6,179,886 | B1 | 1/2001 | Gordeev et al. |
| 6,447,852 | B1 | 9/2002 | Gordeev et al. |
| 6,709,747 | B1 | 3/2004 | Gordeev et al. |
| 6,919,040 | B2 | 7/2005 | Fries et al. |
| 7,008,672 | B2 | 3/2006 | Gordeev et al. |
| 2008/0230280 | A1* | 9/2008 | Keshavan ................. C22C 1/05 175/434 |
| 2008/0302579 | A1* | 12/2008 | Keshavan ................. B22F 7/08 175/434 |
| 2010/0212971 | A1 | 8/2010 | Mukhopadhyay et al. |
| 2010/0294571 | A1* | 11/2010 | Belnap .................... E21B 10/55 175/434 |
| 2011/0023375 | A1 | 2/2011 | Sani et al. |

(Continued)

FOREIGN PATENT DOCUMENTS

| AL | 0982276 A1 | 3/2000 |
|---|---|---|
| EP | 1775275 A1 | 4/2007 |

(Continued)

OTHER PUBLICATIONS

UKIPO Combined Search and Examination Report dated May 9, 2013 for GB1221800.4.

(Continued)

*Primary Examiner* — Pegah Parvini
(74) *Attorney, Agent, or Firm* — Bryan Cave Leighton Paisner LLP

(57) ABSTRACT

A method of forming a super hard PCD construction comprises forming an aggregated mass comprising a catalyst/solvent material for diamond, and one or more of W, Mo, Cr, V, Ti, Zr, Nb, Hf, Ta, Sc, and/or Y, forming a pre-sinter assembly comprising the aggregated mass and a plurality of diamond grains and treating the pre-sinter assembly at UHPT to form a PCD construction. Residual catalyst/solvent and one or more of W, Mo, Cr, V, Ti, Zr, Nb, Hf, Ta, Sc, and/or Y, in non-carbide form at least partially fill a plurality of interstitial regions in the PCD. There is also disclosed a superhard PCD construction comprising a body of PCD material formed of a mass of diamond grains and a non-superhard phase at least partially filling a plurality of interstitial regions, wherein the non-superhard phase comprises one or more of W, Mo, Cr, V, Ti, Zr, Nb, Hf, Ta, Sc, and/or Y, in the non-carbide form.

20 Claims, 2 Drawing Sheets

(56) References Cited

U.S. PATENT DOCUMENTS

| | | | |
|---|---|---|---|
| 2011/0061942 A1* | 3/2011 | DiGiovanni | B24D 99/005 |
| | | | 175/428 |
| 2011/0278074 A1* | 11/2011 | Naidoo | B24D 99/005 |
| | | | 175/428 |
| 2012/0111642 A1* | 5/2012 | DiGiovanni | E21B 10/567 |
| | | | 175/428 |

FOREIGN PATENT DOCUMENTS

| | | |
|---|---|---|
| GB | 2408735 A | 6/2005 |
| GB | 2450221 A | 12/2008 |
| WO | 2008/096314 A2 | 8/2008 |
| WO | 2009/013713 A2 | 1/2009 |
| WO | 2014/039649 A1 | 3/2014 |

OTHER PUBLICATIONS

UKIPO Combined Search and Examination Report dated May 29, 2014 for GB1321220.4.
PCT International Search Report dated Feb. 13, 2014 for PCT/EP2013/075261.

\* cited by examiner

SUPERHARD CONSTRUCTIONS AND METHODS OF MAKING SAME

FIELD

This disclosure relates to superhard constructions and methods of making such constructions, particularly but not exclusively to constructions comprising polycrystalline diamond (PCD) structures for use as cutter inserts or elements for drill bits for boring into the earth.

BACKGROUND

Polycrystalline superhard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials. In particular, tool inserts in the form of cutting elements comprising PCD material are widely used in drill bits for boring into the earth to extract oil or gas. The working life of superhard tool inserts may be limited by fracture of the superhard material, including by spalling and chipping, or by wear of the tool insert.

Cutting elements such as those for use in rock drill bits or other cutting tools typically have a body in the form of a substrate which has an interface end/surface and a super hard material which forms a cutting layer bonded to the interface surface of the substrate by, for example, a sintering process. The substrate is generally formed of a tungsten carbide-cobalt alloy, sometimes referred to as cemented tungsten carbide and the super hard material layer is typically polycrystalline diamond (PCD), polycrystalline cubic boron nitride (PCBN) or a thermally stable product TSP material such as thermally stable polycrystalline diamond.

Polycrystalline diamond (PCD) is an example of a superhard material (also called a superabrasive material) comprising a mass of substantially inter-grown diamond grains, forming a skeletal mass defining interstices between the diamond grains. PCD material typically comprises at least about 80 volume % of diamond and is conventionally made by subjecting an aggregated mass of diamond grains to an super high pressure of greater than about 5 GPa, typically about 5.5 GPa and temperature of at least about 1,200° C., for example typically about 1440° C.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material.

Catalyst materials for diamond typically include any Group VIII element and common examples are cobalt, iron, nickel and certain alloys including alloys of any of these elements. Most typically, PCD is formed on a cobalt-cemented tungsten carbide substrate, which provides a source of cobalt solvent-catalyst for the PCD. Materials that do not promote substantial coherent intergrowth between the diamond grains may themselves form strong bonds with diamond grains, but are not suitable solvent-catalysts for PCD sintering.

During sintering of the body of PCD material, a constituent of the cemented-carbide substrate, such as cobalt in the case of a cobalt-cemented tungsten carbide substrate, liquefies and sweeps from a region adjacent the volume of diamond particles into interstitial regions between the diamond particles.

In this example, the cobalt acts as a catalyst to facilitate the formation of bonded diamond grains. Optionally, a metal-solvent catalyst may be mixed with diamond particles prior to subjecting the diamond particles and substrate to the HPHT process. The interstices within PCD material may at least partly be filled with the catalyst material. The inter-grown diamond structure therefore comprises original diamond grains as well as a newly precipitated or re-grown diamond phase, which bridges the original grains. In the final sintered structure, catalyst/solvent material generally remains present within at least some of the interstices that exist between the sintered diamond grains.

Cemented tungsten carbide which may be used to form a suitable substrate is formed from carbide particles being dispersed in a cobalt matrix by mixing tungsten carbide particles/grains and cobalt together then heating to solidify.

To form the cutting element with an super hard material layer such as PCD or PCBN, diamond particles or grains or CBN grains are placed adjacent the cemented tungsten carbide body in a refractory metal enclosure such as a niobium enclosure and are subjected to high pressure and high temperature so that inter-grain bonding between the diamond grains or CBN grains occurs, forming a polycrystalline super hard diamond or polycrystalline CBN layer.

In some instances, the substrate may be fully cured prior to attachment to the super hard material layer whereas in other cases, the substrate may be green, that is, not fully cured. In the latter case, the substrate may fully cure during the HTHP sintering process. The substrate may be in powder form and may solidify during the sintering process used to sinter the super hard material layer.

Ever increasing drives for improved productivity in the earth boring field place create ever increasing demands on the materials used for cutting rock. Specifically, PCD materials with improved abrasion and impact resistance are required to achieve faster cut rates and longer tool life.

Cutting elements for use in rock drilling and other operations require high abrasion resistance and impact resistance. One of the factors limiting the success of the polycrystalline diamond (PCD) abrasive cutters is the generation of heat due to friction between the PCD and the work material. This heat causes the thermal degradation of the diamond layer. The thermal degradation increases the wear rate of the cutter through increased cracking and spalling of the PCD layer as well as back conversion of the diamond to graphite causing increased abrasive wear.

A problem known to exist with such conventional PCD compacts is that they are vulnerable to thermal degradation when exposed to elevated temperatures during cutting and/or wear applications. It is believed that this is due, at least in part, to the presence of residual solvent/catalyst material in the microstructural interstices which, due to the differential that exists between the thermal expansion characteristics of the interstitial solvent metal catalyst material and the thermal expansion characteristics of the intercrystalline bonded diamond, is thought to have a detrimental effect on the performance of the PCD compact at high temperatures. Such differential thermal expansion is known to occur at temperatures of about 400 [deg.] C., and is believed to cause ruptures to occur in the diamond-to-diamond bonding, and eventually result in the formation of cracks and chips in the PCD structure. The chipping or cracking in the PCD table may degrade the mechanical properties of the cutting element or lead to failure of the cutting element during drilling or cutting operations thereby rendering the PCD structure unsuitable for further use.

Another form of thermal degradation known to exist with conventional PCD materials is one that is also believed to be related to the presence of the solvent metal catalyst in the interstitial regions and the adherence of the solvent metal catalyst to the diamond crystals. Specifically, at high temperatures, diamond grains may undergo a chemical breakdown or back-conversion with the solvent/catalyst. At extremely high temperatures, the solvent metal catalyst is believed to cause an undesired catalyzed phase transformation in diamond such that portions of diamond grains may transform to carbon monoxide, carbon dioxide, graphite, or combinations thereof, thereby degrading the mechanical properties of the PCD material and limiting practical use of the PCD material to about 750 [deg.] C.

Attempts at addressing such unwanted forms of thermal degradation in conventional PCD materials are known in the art. Generally, these attempts have focused on the formation of a PCD body having an improved degree of thermal stability when compared to the conventional PCD materials discussed above. One known technique of producing a PCD body having improved thermal stability involves, after forming the PCD body, removing all or a portion of the solvent catalyst material therefrom using, for example, chemical leaching. Removal of the catalyst/binder from the diamond lattice structure renders the polycrystalline diamond layer more heat resistant.

Conventional chemical leaching techniques often involve the use of highly concentrated, toxic, and/or corrosive solutions, such as aqua regia and mixtures including hydrofluoric acid (HF), to dissolve and remove metallic-solvent/catalysts from polycrystalline diamond materials. As such mixtures are highly toxic, the use of these carry severe health and safety risks and therefore processes for treating PCD with such mixtures must be carried out by specialised personnel under well-controlled and monitored conditions to minimise the risk of injury to the operators of such processes.

Furthermore, as PCD material is made more wear resistant, for example by removal of the residual catalyst material from interstices in the diamond matrix, it typically becomes more brittle and prone to fracture and therefore tends to have compromised or reduced resistance to spalling. This is problematic because due to the hostile environment in which cutting elements typically operate, cutting elements having cutting layers with improved abrasion resistance, strength and fracture toughness are desired.

In some conventional PCD material, to improve thermal stability, the interstices are at least partly filled with ceramic material such as SiC or salt material such as carbonate compounds which may be thermally stable.

In other conventional examples, the super hard materials may be formed from composite materials comprising diamond or cBN grains held together by a matrix comprising ceramic material, such as silicon carbide (SiC), or cemented carbide material, such as Co-bonded WC material (for example, as described in U.S. Pat. Nos. 5,453,105 or 6,919,040). For example, certain SiC-bonded diamond materials may comprise at least about 30 volume percent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

An additional conventional approach to addressing thermal stability in PCD material is to include carbide forming additions such as vanadium carbide (VC) or $Co_3Sn_3C$.

Each of the above conventional solutions has various problems associated with it. In particular, the mechanical properties of PCD sintered with cobalt is markedly superior to any other binder system and additions to the cobalt in the form of carbide formers reduce the mechanical properties of the PCD material.

There is a therefore a need to overcome or substantially ameliorate the above-mentioned problems to provide a composite material having increased resistance to spalling and chipping and a method of forming such composites.

SUMMARY

Viewed from a first aspect there is provided a method of forming a super hard polycrystalline diamond construction comprising:

forming an aggregated mass comprising a catalyst/solvent material for diamond, and one or more of W, Mo, Cr, V, Ti, Zr, Nb, Hf, Ta, Sc, and/or Y;

forming a pre-sinter assembly comprising the aggregated mass and a plurality of diamond grains; and treating the pre-sinter assembly in the presence of the catalyst/solvent material for the diamond grains at an super high pressure of around 5.5 GPa or greater and a temperature at which the diamond material is more thermodynamically stable than graphite to sinter together the diamond grains to form a polycrystalline diamond construction, the diamond grains exhibiting inter-granular bonding and defining a plurality of interstitial regions therebetween, residual catalyst/solvent and one or more of W, Mo, Cr, V, Ti, Zr, Nb, Hf, Ta, Sc, and/or Y, in non-carbide form at least partially filling a plurality of the interstitial regions.

In some embodiments, the step of providing a mass of diamond grains comprises providing a mass of diamond grains having a first fraction having a first average size and a second fraction having a second average size, the first fraction having an average grain size ranging from about 10 to 60 microns, and the second fraction having an average grain size less than the size of the first fraction.

In other embodiments, the step of forming a pre-sinter assembly comprises providing a mass of grains of superhard material comprising three or more grain size modes to form a multimodal mass of grains comprising a blend of grain sizes having associated average grain sizes.

The pre-sinter assembly may, for example, be subjected to a pressure of greater than around 6 GPa, or around 6.8 GPa, or around 7 GPa, or around 8 GPa, or around 10 GPa, or around 13 GPa.

In some embodiments, the step of forming an aggregated mass comprises forming the mass to comprise up to around 30 atomic % of one or more of W, Mo, Cr, V, Ti, Zr, Nb, Hf, Ta, Sc, and/or Y.

In some embodiments, the step of forming an aggregated mass comprises forming the mass to comprise up to around 20 wt % of non-diamond phase in the sintered construction.

The pre-sinter assembly may, for example, further comprise a body of cemented carbide material to form a substrate bonded to the body of PCD material during sintering, the body of cemented carbide material being in powder form or pre-sintered solid form.

In some embodiments, the step of forming an aggregated mass comprises mixing a plurality of natural and/or synthetic diamond grains.

The step of sintering may comprise, for example, subjecting the pre-sinter assembly to a temperature of between around 1300 to around 1800 degrees C., such as a temperature of around 1440 deg C. for around 5 minutes.

In some embodiments, the method further comprises treating the polycrystalline diamond construction to remove catalyst material from a plurality of the interstitial regions between inter-bonded diamond grains after sintering.

Viewed from a second aspect there is provided a superhard polycrystalline diamond construction comprising a body of polycrystalline diamond material formed of:

a mass of diamond grains exhibiting inter-granular bonding and defining a plurality of interstitial regions therebetween, a non-superhard phase at least partially filling a plurality of the interstitial regions; wherein the non-superhard phase comprises one or more of W, Mo, Cr, V, Ti, Zr, Nb, Hf, Ta, Sc, and/or Y, in the non-carbide form.

The non-superhard phase may further comprise, for example cobalt and/or nickel in the form of residual solvent/catalyst.

In some embodiments, the superhard polycrystalline diamond construction further comprises a substrate bonded to the body of polycrystalline diamond material along an interface, such as a cemented carbide material.

Viewed from a further aspect there is provided a tool comprising the superhard polycrystalline construction defined above, the tool being for cutting, milling, grinding, drilling, earth boring, rock drilling or other abrasive applications.

The tool may comprise, for example, a drill bit for earth boring or rock drilling, a rotary fixed-cutter bit for use in the oil and gas drilling industry, or a rolling cone drill bit, a hole opening tool, an expandable tool, a reamer or other earth boring tools.

Viewed from another aspect there is provided a drill bit or a cutter or a component therefor comprising the superhard polycrystalline construction defined above.

BRIEF DESCRIPTION OF THE DRAWINGS

The present invention will now be described by way of example and with reference to the accompanying drawings in which.

DESCRIPTION

As used herein, a "superhard material" is a material having a Vickers hardness of at least about 28 GPa. Diamond and cubic boron nitride (cBN) material are examples of superhard materials.

As used herein, a "superhard construction" means a construction comprising a body of polycrystalline superhard material. In such a construction, a substrate may be attached thereto.

As used herein, polycrystalline diamond (PCD) is a type of polycrystalline superhard (PCS) material comprising a mass of diamond grains, a substantial portion of which are directly inter-bonded with each other and in which the content of diamond is at least about 80 volume percent of the material. In one embodiment of PCD material, interstices between the diamond grains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. PCD material may comprise at least a region from which catalyst material has been removed from the interstices, leaving interstitial voids between the diamond grains.

As used herein, PCBN (polycrystalline cubic boron nitride) material refers to a type of superhard material comprising grains of cubic boron nitride (cBN) dispersed within a matrix comprising metal or ceramic. PCBN is an example of a superhard material.

A "catalyst material" for a superhard material is capable of promoting the growth or sintering of the superhard material.

The term "substrate" as used herein means any substrate over which the super hard material layer is formed. For example, a "substrate" as used herein may be a transition layer formed over another substrate. Additionally, as used herein, the terms "radial" and "circumferential" and like terms are not meant to limit the feature being described to a perfect circle.

Figure 1:
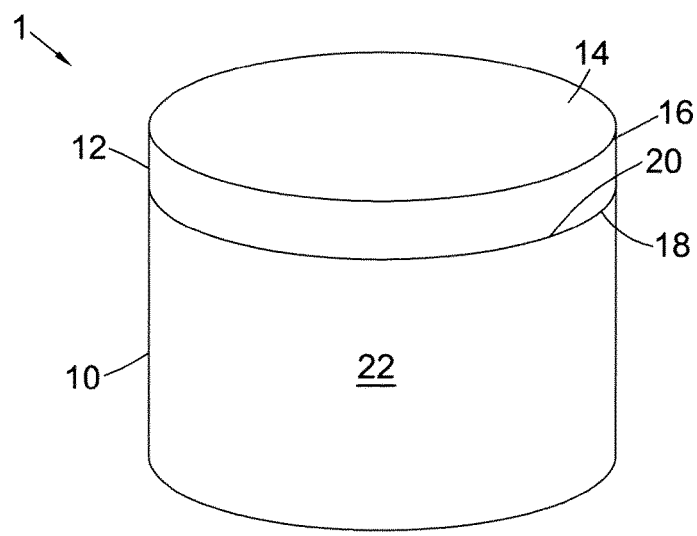
FIG. 1 is a polycrystalline diamond (PCD) structure attached to a substrate.

The superhard construction 1 shown in the FIG. 1 may be suitable, for example, for use as a cutter insert for a drill bit for boring into the earth.

Like reference numbers are used to identify like features in all drawings.

In an embodiment as shown in FIG. 1, a cutting element 1 includes a substrate 10 with a layer of super hard material 12 formed on the substrate 10. The substrate may be formed of a hard material such as cemented tungsten carbide. The super hard material may be, for example, polycrystalline diamond (PCD), or a thermally stable product such as thermally stable PCD (TSP). The cutting element 1 may be mounted into a bit body such as a drag bit body (not shown). The exposed top surface of the super hard material opposite the substrate forms the cutting face 14, which is the surface which, along with its edge 16, performs the cutting in use.

At one end of the substrate 10 is an interface surface 18 that interfaces with the super hard material layer 12 which is attached thereto at this interface surface. The substrate 10 is generally cylindrical and has a peripheral surface 20 and a peripheral top edge 22.

The grains of super hard material, such as diamond grains or particles in the starting mixture prior to sintering may be, for example, multimodal, that is, the feed comprises a mixture of two or more of a coarse fraction of diamond grains and a fine fraction of diamond grains.

Sizing of diamond particles/grains into fine fraction, coarse fraction, or other sizes in between, may be through known processes such as jet-milling of larger diamond grains and the like.

In embodiments where the super hard material is polycrystalline diamond material, the diamond grains used to form the polycrystalline diamond material may be natural or synthetic.

In some embodiments, the binder catalyst/solvent may comprise cobalt or some other iron group elements, such as iron or nickel, or an alloy thereof.

The cemented metal carbide substrate may be conventional in composition and, thus, may include any of the Group IVB, VB, or VIB metals, which are pressed and sintered in the presence of a binder of cobalt, nickel or iron, for example or alloys thereof. In some embodiments, the metal carbide is tungsten carbide.

An embodiment of a superhard construction comprising a body of PCD material bonded to a substrate was prepared as follows. A mass comprising solvent/catalyst material, such as cobalt or nickel and an addition of any one or more of W, Mo, Cr, V, Ti, Zr, Nb, Hf, Ta, Sc, and/or Y to around 30 atomic % were mixed to form an aggregated mass. A pre-sinter mixture was prepared by combining a non-diamond phase mixture designed to comprise up to around 20 wt % in the sintered product and the remainder being diamond grains and this was placed in an HP/HT reaction cell assembly together with a mass of carbide to form the substrate and the contents of the cell assembly were subjected to HP/HT processing. The HP/HT processing conditions selected were sufficient to effect intercrystalline bonding between adjacent grains of diamond particles and the joining of sintered particles to the cemented metal carbide support to form a PCD construction comprising a PCD structure integrally formed on and joined to the cemented carbide substrate. In one embodiment, the processing conditions generally involve the imposition for about 3 to 120 minutes of a temperature of at least about 1200 degrees C. and an super high pressure of greater than about 5 GPa. In some embodiments, the pre-sinter assembly may be subjected to a pressure of at least about 6 GPa, at least about 6.5 GPa, at least about 7 GPa or even at least about 7.5 GPa or more at a temperature of around 1440 deg C.

In some embodiments, both the bodies of, for example, diamond and carbide material plus sintering aid/binder/catalyst/additions are applied as powders and sintered simultaneously in a single UHP/HT process.

In another embodiment, the substrate may be pre-sintered in a separate process before being bonded together in the HP/HT press during sintering of the super hard polycrystalline material.

The solvent/catalyst for diamond mixed with the additions forming the aggregated mass may be introduced into the mass of diamond grains by various methods, including, for example, blending solvent/catalyst material with the additions and then blending this aggregated mass in powder form with the diamond grains, or depositing solvent/catalyst material/additions mixture onto surfaces of the diamond grains.

General methods of depositing solvent/catalyst for diamond, such as cobalt, onto surfaces of diamond grains are well known in the art, and include chemical vapour deposition (CVD), physical vapour deposition (PVD), sputter coating, electrochemical methods, electroless coating methods and atomic layer deposition (ALD). It will be appreciated that the advantages and disadvantages of each depend on the nature of the sintering aid material and coating structure to be deposited, and on characteristics of the grain.

In some embodiments, the cemented carbide substrate may be formed of tungsten carbide particles bonded together by the binder material, the binder material comprising an alloy of Co, Ni and Cr. The tungsten carbide particles may form at least 70 weight percent and at most 95 weight percent of the substrate. The binder material may comprise between about 10 to 50 wt. % Ni, between about 0.1 to 10 wt. % Cr, and the remainder weight percent comprises Co.

Embodiments are described in more detail below with reference to the following example which is provided herein by way of illustration only and is not intended to be limiting.

EXAMPLE

A first embodiment of a superhard construction comprising a body of PCD material bonded to a substrate was prepared as follows. A mass comprising cobalt as the solvent/catalyst material and an addition of tungsten in an amount of around 20 atomic % was mixed to form an aggregated mass. A pre-sinter mixture was prepared comprising the aggregated mass designed to form around 15 wt % of the non-diamond phase in the sintered compact and the remainder being diamond grains having an average grain size of around 12 microns. The pre-sinter mixture was then placed in an HP/HT reaction cell assembly together with a mass of carbide to form the substrate and the contents of the cell assembly were subjected to HP/HT processing. The HP/HT processing conditions sufficient to effect intercrystalline bonding between adjacent grains of diamond particles and the joining of sintered particles to the cemented metal carbide support to form a PCD construction comprising a PCD structure integrally formed on and joined to the cemented carbide substrate. For example, the pre-sinter assembly was subjected to a pressure of around 6.8 GPa and a temperature of around 1500 deg C. for around 5 minutes.

A further embodiment of a superhard construction comprising a body of PCD material bonded to a substrate was prepared as follows. A mass comprising cobalt as the solvent/catalyst material and an addition of molybdenum in an amount of around 20 atomic % was mixed to form an aggregated mass. A pre-sinter mixture sufficient to form around 15 wt % of the non-diamond phase in the sintered compact and the remainder being diamond grains having an average grain size of around 12 microns was prepared and was placed in an HP/HT reaction cell assembly together with a mass of carbide to form the substrate and the contents of the cell assembly were subjected to HP/HT processing. The HP/HT processing conditions sufficient to effect intercrystalline bonding between adjacent grains of diamond particles and the joining of sintered particles to the cemented metal carbide support to form a PCD construction comprising a PCD structure integrally formed on and joined to the cemented carbide substrate. For example, the pre-sinter assembly was subjected to a pressure of around 6.8 GPa and a temperature of around 1500 deg C. for around 5 minutes.

A sample conventional body of PCD material was also prepared to use as a standard comparison. The PCD construction was prepared by forming an aggregated mass of cobalt as the solvent/catalyst material sufficient to form around 15 wt % of the non-diamond phase in the sintered compact and diamond grains having an average grain size of around 12 microns. The aggregated mass was placed in an HP/HT reaction cell assembly together with a mass of carbide to form the substrate and the contents of the cell assembly were subjected to HP/HT processing. The HP/HT processing conditions sufficient to effect intercrystalline bonding between adjacent grains of diamond particles and the joining of sintered particles to the cemented metal carbide support to form a PCD construction comprising a PCD structure integrally formed on and joined to the cemented carbide substrate. For example, the pre-sinter assembly was subjected to a pressure of around 6.8 GPa and a temperature of around 1500 deg C. for around 5 minutes.

To determine the elemental composition of the bodies of PCD material so formed, conventional XRF, ICP, TEM and EDS techniques were used. It was determined that the body of PCD material comprised the interbonded diamond grains with interstitial regions therebetween and the non-diamond phase mixture of the additive, namely W in the first example and Mo in the second example, in non-carbide form, and residual solvent/catalyst being located in a plurality of the interstitial regions.

To gain knowledge of the thermal degradation process in the samples of PCD material so formed, the bodies of PCD material were then subjected to various temperature conditions to simulate working environments. For example, the bodies of PCD material were heated in an argon atmosphere for various times and temperatures. Temperatures of 700° C., 750° C., 800° C. and 850° C. were used at time intervals of 30 min, 2 hours, 4 hours and 6 hours. X-ray diffraction was then performed to determine the resulting phases and the lattice parameters. Raman spectroscopy was performed to determine the presence of graphite. Transmission electron microscopy (TEM) using the techniques of High Annular Angle Dark Field (HAADF) Scanning-TEM (STEM) and Electron Energy Loss Spectroscopy (EELS) was used to show the chemical changes of the material due to the heat treatment.

Figure 2:
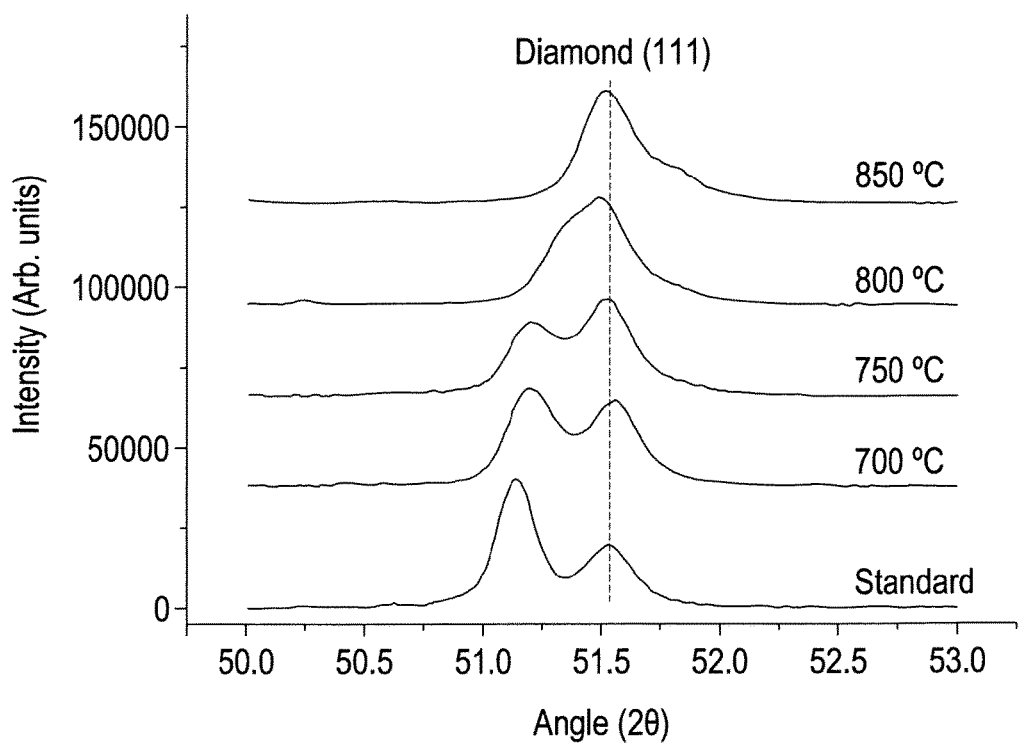
FIG. 2 is an XRD pattern of the (111) diamond peak of the PCD samples heated to various temperatures for 2 hours showing the peak shift in the cobalt lattice parameter.

FIG. 2 shows the XRD pattern of the PCD heated for 2 hours at different temperatures. It was seen that the cobalt lattice parameter for the standard material is increased to 3.59 Å compared to the 3.54 Å theoretical value due to presence of dissolved tungsten atoms. The XRD analysis showed that these additions of Mo and W resulted in an increase in the lattice parameter of fcc-cobalt as witnessed by the shift in the (111) and (200) peaks. It will also be seen from FIG. 2 that, during heat treatment, the cobalt lattice parameter is decreasing, indicating the removal of the W or Mo atoms from the cobalt lattice. A similar relationship was observed for the cobalt lattice parameter as a function of time for heat treatment at 800° C. To determine this, the samples were subjected to temperatures of 800° C. in vacuum and XRD spectra taken at 15 minute intervals and the intensity of the (200) graphite peak was measured with XRD during the heat treatment.

Figure 3:
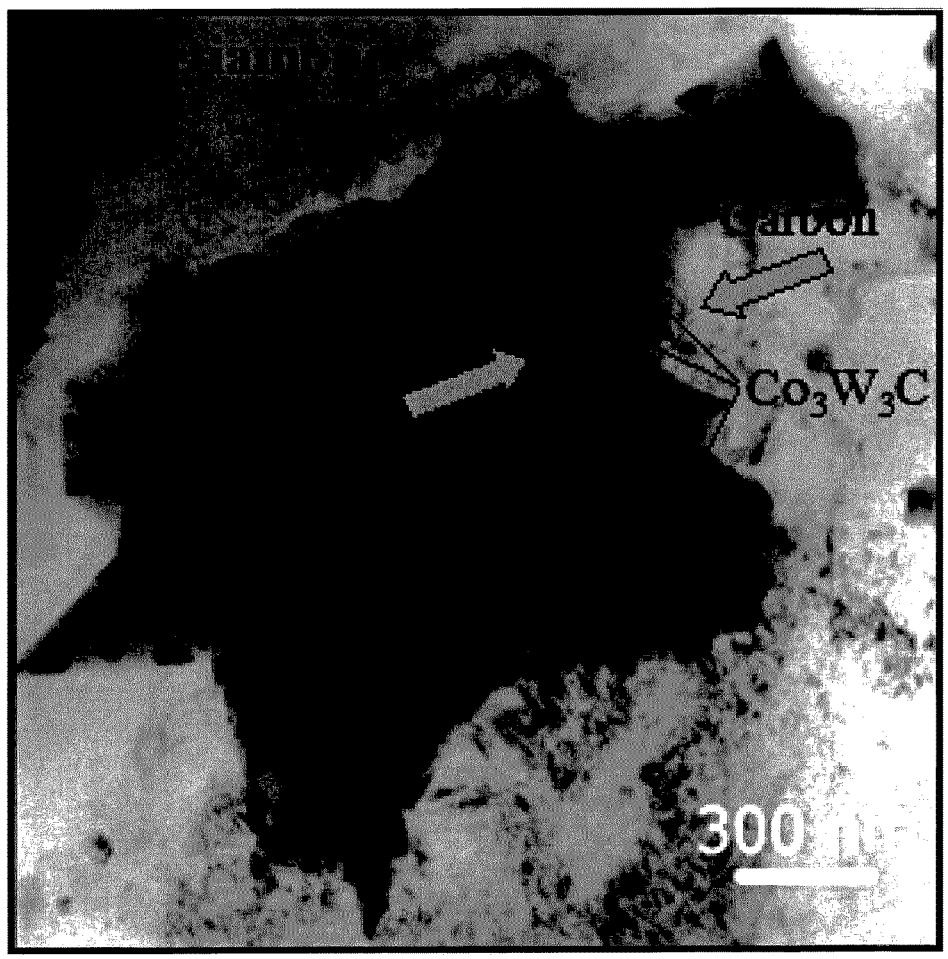
FIG. 3 is a Bright-field TEM image of a cobalt pool within a PCD sample heated at 750° C. for 2 hours.

FIG. 3 shows a bright-field TEM image of a degraded cobalt pool. The dark phase consists of $Co_3W_3C$ phases formed by the combination of tungsten (from solid solution), carbon (from surrounding diamond) and cobalt pool during the heat treatment.

It was shown that the presence of dissolved tungsten in the cobalt pools combines with the dissolved diamond to form Co—W—C eta-phase during heat treatments to simulate working conditions when the PCD construction is used in, for example, drilling applications. The eta-phase particles were shown to precipitate at diamond/cobalt interfaces.

The onset of graphite formation in the standard sample used for comparison was visible after 15 minutes, compared to the onset of graphite after more than 5 hours for the sample containing Tungsten (3.2) and Molybdenum (3.3).

Whilst not wishing to be bound by a particular theory, it is proposed that this shows that additions of, for example, tungsten and/or molybdenum to PCD may be used to delay graphitization when the material is exposed to temperatures 700° C. and above, namely to improve the resistance to PCD to graphitization. In particular, the additive such as Mo or W to the non-diamond phase does not form a reaction product (namely a carbide) during sintering. By contrast, the reaction product forms in the sintered product during exposure to elevated temperatures such as during use of the product in drilling applications and not during the synthesis cycle used to form the PCD body. During exposure to elevated temperatures the graphitization of PCD is therefore delayed due to the formation of the reaction product (carbide/eta-phase), for example when the PCD is exposed to temperatures of around 800° C. The levels of carbides formed in the sintered product during use at these temperatures were found to be between around 0.1-40 at % with respect to the cobalt binder in the examples described, as measured using a suitable technique such as ICP, XRF or XRD (peak shift).

Furthermore, the peak ratio of the most intense peak of the carbide so formed (WC, or MoC in these examples) and the cobalt (200) peak was less than around 0.5%.

While various embodiments have been described with reference to a number of examples, those skilled in the art will understand that various changes may be made and equivalents may be substituted for elements thereof and that these examples are not intended to limit the particular embodiments disclosed. In particular, whilst the embodiments have been illustrated with reference to additions of W or Mo, Cr, V, Ti, Zr, Nb, Hf, Ta, Sc, Y and combinations thereof could be used as the additive.

To assist in improving further the thermal stability of the sintered structure, the catalysing material may removed from a region of the polycrystalline layer adjacent an exposed surface thereof. Generally, that surface will be on a side of the polycrystalline layer opposite to the substrate and will provide a working surface for the polycrystalline diamond layer. Removal of the catalysing material may be carried out using methods known in the art such as electrolytic etching, and acid leaching and evaporation techniques.

The invention claimed is:

1. A method of forming a super hard polycrystalline diamond construction comprising:
    forming an aggregated mass comprising a catalyst/solvent material for diamond, and one or more of W, Cr, V, Ti, Zr, Nb, Hf, Ta, Sc, and/or Y;
    forming a pre-sinter assembly comprising the aggregated mass and a plurality of diamond grains; and
    treating the pre-sinter assembly in the presence of the catalyst/solvent material for the diamond grains at an super high pressure of around 5.5 GPa or greater and a temperature at which the diamond material is more thermodynamically stable than graphite to sinter together the diamond grains to form a polycrystalline diamond construction, the diamond grains exhibiting inter-granular bonding and defining a plurality of interstitial regions therebetween, residual catalyst/solvent and one or more of dissolved W, Cr, V, Ti, Zr, Nb, Hf, Ta, Sc, and/or Y, in non-carbide form at least partially filling a plurality of the interstitial regions.

2. The method of claim 1, wherein the step of forming a pre-sinter assembly comprises providing a mass of diamond grains having a first fraction having a first average size and a second fraction having a second average size, the first fraction having an average grain size ranging from about 10 to 60 microns, and the second fraction having an average grain size less than the size of the first fraction.

3. The method of claim 1, wherein the step of forming a pre-sinter assembly comprises providing a mass of grains of superhard material comprising three or more grain size modes to form a multimodal mass of grains comprising a blend of grain sizes having associated average grain sizes.

4. A method according to claim 1, wherein the step of treating the pre-sinter assembly comprises subjecting the pre-sinter assembly to a pressure of greater than:
    around 8 GPa.

5. A method according to claim 1, wherein the step of forming an aggregated mass comprises forming the mass to comprise up to around 30 atomic % of one or more of W, Cr, V, Ti, Zr, Nb, Hf, Ta, Sc, and/or Y.

6. A method according to claim 1, wherein the step of forming an aggregated mass comprises forming the mass to comprise up to around 20 wt % of non-diamond phase in the sintered construction.

7. A method according to claim 1, wherein the pre-sinter assembly further comprises a body of cemented carbide material to form a substrate bonded to the body of PCD material during sintering, the body of cemented carbide material being in powder form or pre-sintered solid form.

8. A method according to claim 1, wherein the step of forming an aggregated mass comprises mixing a plurality of natural and/or synthetic diamond grains.

9. A method according to claim 1, wherein the step of sintering comprises sintering at a temperature of between around 1300 to around 1800 degrees C.

10. A method according to claim 1, wherein the step of treating the pre-sinter assembly comprises subjecting the pre-sinter assembly to a temperature of around 1440 deg C. for around 5 minutes.

11. A method as claimed in claim 1, further comprising treating the polycrystalline diamond construction to remove catalyst material from a plurality of the interstitial regions between inter-bonded diamond grains after sintering.

12. A superhard polycrystalline diamond construction comprising a body of polycrystalline diamond material formed of:
a mass of diamond grains exhibiting inter-granular bonding and defining a plurality of interstitial regions therebetween,
a non-superhard phase at least partially filling a plurality of the interstitial regions; wherein the non-superhard phase comprises one or more of dissolved W, Cr, V, Ti, Zr, Nb, Hf, Ta, Sc, and/or Y, in the non-carbide form.

13. The superhard polycrystalline diamond construction of claim 12, wherein the non-superhard phase further comprises cobalt.

14. The superhard polycrystalline diamond construction of claim 12, wherein the non-superhard phase further comprises nickel.

15. The superhard polycrystalline diamond construction of claim 12, further comprising a substrate bonded to the body of polycrystalline diamond material along an interface.

16. The superhard polycrystalline diamond construction of claim 15, wherein the substrate is formed of cemented carbide material.

17. A tool comprising the superhard polycrystalline diamond construction according to claim 12, the tool being for any one or more of cutting, milling, grinding, drilling, earth boring, or rock drilling.

18. A tool according to claim 17, wherein the tool comprises a drill bit for earth boring or rock drilling, or a rotary fixed-cutter bit for use in oil and gas drilling.

19. A tool according to claim 17, wherein the tool is a rolling cone drill bit, a hole opening tool, an expandable tool, a reamer or other earth boring tools.

20. A drill bit or a cutter or a component therefor comprising the superhard polycrystalline construction according to claim 12.

* * * * *